ALEXANDER E. MARTENS
INVENTOR.

ALEXANDER E. MARTENS
INVENTOR.

April 15, 1969          A. E. MARTENS          3,439,241

DIGITALLY PROGRAMMED POSITION MOTOR CONTROL

Filed Dec. 29, 1965

ALEXANDER E. MARTENS
*INVENTOR.*

ATTORNEYS

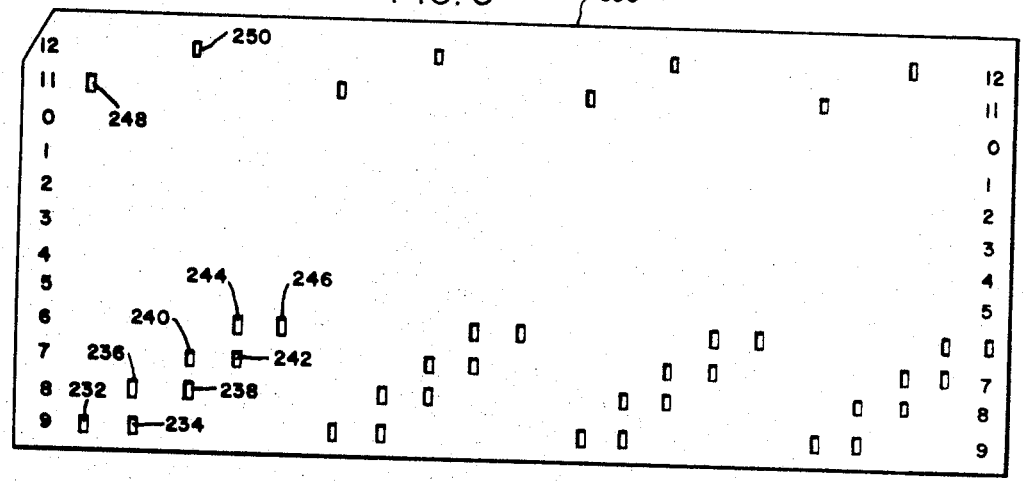
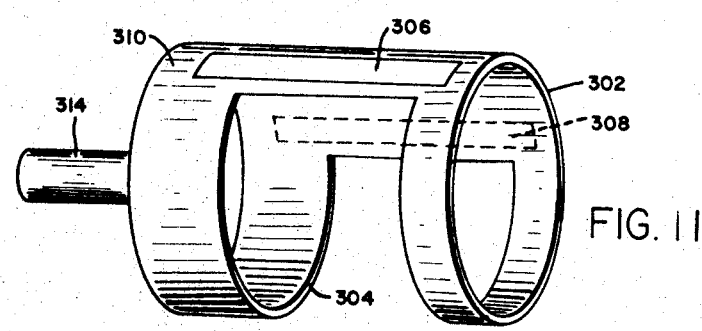
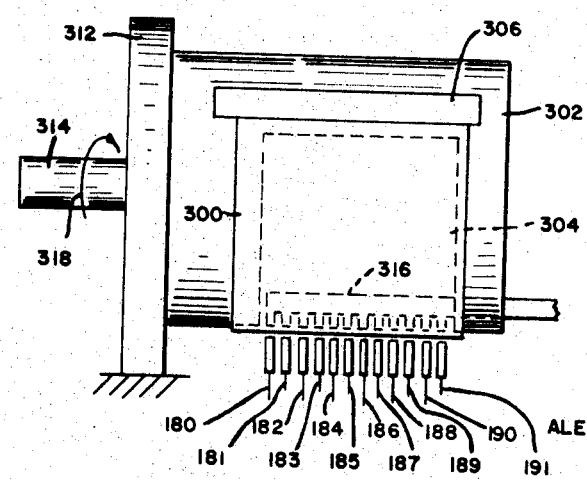

United States Patent Office 3,439,241
Patented Apr. 15, 1969

3,439,241
DIGITALLY PROGRAMMED POSITION MOTOR CONTROL
Alexander E. Martens, Greece, N.Y., assignor to Bausch & Lomb Incorporated, Rochester, N.Y., a corporation of New York
Filed Dec. 29, 1965, Ser. No. 526,965
Int. Cl. H02p 1/54, 5/46, 7/74
U.S. Cl. 318—18                                19 Claims

ABSTRACT OF THE DISCLOSURE

A plurality of signals of different frequencies are generated and are applied to a plurality of switching circuits. Digital information is stored in a movable storage medium in a preset pattern defining a switching sequence. The digital information is detected and applied to a plurality of control circuits which actuate the switching circuits according to the switching sequence to translate trains of periodic signals. The number of periodic signals in each of the trains is determined by particular frequency being translated and time duration the switching circuits are actuated.

---

This invention relates to control systems in general and more particularly to control systems for providing repetitive operation.

It is well known that considerable cost savings and an improved quality control can be achieved by the automation of manufacturing processes. This is particularly true in the case of high volume production items wherein the automatic process can be programmed to repeat a continuous series of controlled steps per each item produced. In such processes, a plurality of controlled or forming elements are simultaneously controlled for synchronous and repeatable movement along predetermined paths that are correlated in space and time as the material is fed into the machines. This includes the establishment of a predetermined starting position and controlling the movement of the controlled elements from the starting position (amount and rate) in at least one direction for simultaneous arrival at a predetermined position to provide a continuous path type of control.

A particular illustration of such processes are spring forming machines wherein three basic movements are required to control the forming of the spring i.e. diameter, pitch and rate of feed of the wire. Presently the controlled elements of the spring forming machines are mechanically controlled through the use of cams. A specially formed cam, coupled to rotate about a reference point such as a shaft, is provided for each of the controlled or forming elements. The forming elements are generally restrained for limited movement in a straight line and are spring coupled to urge against the cam through a cam follower so that the forming element follows a controlled path along the straight line as determined by the shape of the cam.

As the cam is rotated, the amount of movement of the forming element from the starting position is governed by the distance between the cam shaft and the cam follower, while the rate of movemnt at any particular instant of time is determined by the tangent of the curve at the point wherein the cam is in contact with the cam follower. Each of the cam shafts are coupled together to correlate the paths in space and time to provide for the required contour control.

In such mechanncally cam controlled processes the initial setup is complex and time consuming. The movement of a plurality of forming elements and material feed must be mechanically precisely correlated or adjusted for the required space and time relation through a variety of adjustable cam linkages. Such precise correlation becomes more of an art than a predictable process requiring a considerable shut-down time each time the shape of the device to be built is changed or the linkage, etc. is changed to correct errors in the initial set-up. In many cases the shut-down time becomes a substantial portion of the total operating time of the machine.

The entire set-up procedure can be greatly simplified with improved accuracy and repeatability by substituting an electronic control system for the mechanical system wherein the motion of the cam is simulated electronically and each controlled or forming element is mechanically independent but synchronously controlled. With such a control system, the controlled movement of each forming element can be separately adjusted and the entire system synchronized through the use of electronic timing signals.

The control system for such processes must include economical data entry means for controlling the path of the tools and/or materials to provide a large combination of shapes that can be formed by the automated process. In addition, the control system should include simple means for modifying the path of the tool, etc. after a trial run on an item has been made to correct any errors in the original programmed tool, etc. path wherein such changes should not require a considerable period of machine shut-down. In addition, such electronically controlled machines should be moderately priced in order to complete with machines employing the mechanical control systems.

The use of conventional electronic control or computer systems employing magnetic tape or magnetic drum data storage is not readily adaptable because of the expense and complexity of the transport, recording and reading equipment. Furthermore, the amount of input data required to effectively simulate a cam is limited wherein the expense of a high density data storage of the magnetic tape or drum is not justified. Finally, conventional magnetic or punched computer data entry systems are generally complex requiring specially trained personnel to develop the programmed devices for these systems.

It is therefore an object of this invention to provide a new and improved control system.

It is also an object of this invention to provide economic data entry means for control system.

It is also an object of this invention to provide a new and improved signal generating means for control systems for electronically simulating the action of mechanical cams.

It is a further object of this invention to provide a new and improved control system for simultaneously and electronically controlling the movement of a plurality of controlled elements along predetermined paths that are correlated in space and time.

It is still a further object of this invention to provide a new and improved electronic control system that is economically feasible for automating high speed repetitious processes.

It is another object of this invention to provide a predetermined number of electrical frequencies which may be controlled through a program means and switching circuits to operate a motor for controlling the motion of a controlled element.

It is still a further object of this invention to provide a synchronous signal generator, generating a plurality of desired frequencies and a digital cam which stores digital information to sequentially operate a switching circuit for passing the desired frequency for controlling movement of a controlled element.

The control system embodying the invention includes means for generating a plurality of electrical drive signals having different frequencies which are applied to a plurality of switching circuits. A movably mounted digital cam carries stored digital information in a preset pattern for controlling the motion of a controlled element. Detection means are mounted adjacent to the digital cam for detecting the stored digital information and generating control signals in a predetermined sequence which are applied to the switching circuits to selectively switch the switching circuits "on" for a predetermined period. During the presence of a switching signal the switching circuits pass the applied electrical signal through an amplifier to drive a motor which in turn controls the movement of the controlled element.

Where several controlled elements are to be controlled, or where a single element is to be controlled to travel in several directions simultaneously, one digital cam can be used for each controlled element or direction of motion. Three digital cams (corresponding to the X, Y and Z coordinates) rotated in synchronism with each other provide the switching signals for driving a controlled element in any single or combination of directions. Alternately, depending on the amount of data to be stored, a single digital cam may be used to control several controlled elements. The preferred embodiment of this invention will be described in the following paragraphs and illustrated in the attached drawings.

FIGURE 9 is a second embodiment of a control signal digital cam having digital information stored therein in the form of perforations.

FIGURE 10 is an illustration of a cylindrical drum drive unit and the detection means for the digital cam of FIGURE 9.

FIGURE 11 is a perspective view of the cylindrical drum of FIGURE 10.

In the automation of high speed repetitious manufacturing processes, such as spring making machines, economical data entry is required to provide a simultaneous and continuous path type of control for a plurality of controlled devices such as forming tools and the materials to be formed. By continuous path we mean the travel paths of the tools and materials are in continuous contact and are synchronously controlled with respect to a common time reference so that they arrive at a required position at a predetermined time. The travel paths in most cases are neither constant nor unidirectional so provisions must be made for changes in direction and velocity. In addition, the data entry must be sufficiently flexible so that a great number of controlled movements can be provided so that the automated process is not limited in its use.

Figure 5:
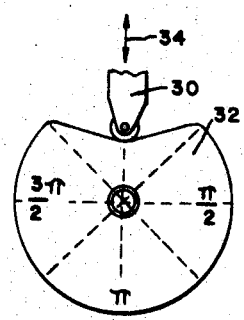
FIGURE 5 illustrates a mechanical cam and cam follower.

As previously mentioned, the controlled elements of a forming process, such as in a spring coiling machine, are mechanically controlled through the use of cam-follower mechanisms. FIGURE 5 is an illustration of a cam-follower mechanism wherein a cam follower 30 engages the peripheral surface of a cam 32 to provide linear motion (continuous path) along the direction designated by the arrows 34. The cam 32 is divided into eight equal sectors. As the cam 32 is rotated, movement of the cam follower 30 from the starting position (as illustrated in FIGURE 5) is governed by the distance between the cam shaft 36 and the portion of the cam 32 engaging the cam follower 30. The rate of movement of the cam follower 30 for any particular sector is determined by the tangent to the curve at the point wherein the cam is in contact with the cam follower 30.

Figure 6:
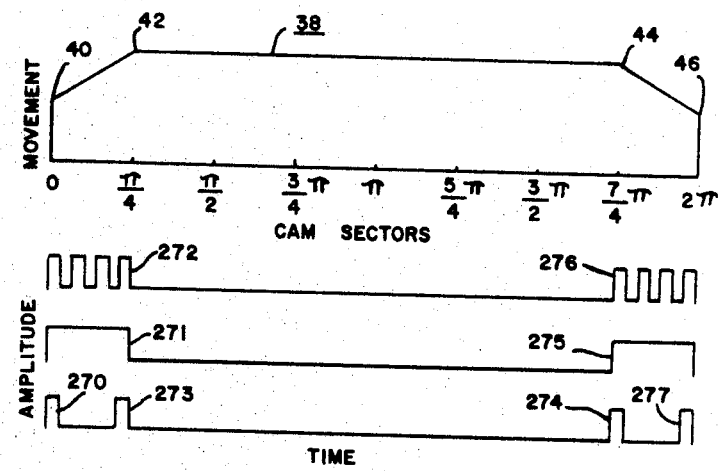
FIGURE 6 illustrates the motion of the cam follower and the electrical control, switching and drive signals generated by the control system of FIGURES 1 and 2 to produce a similar motion electrically.

The continuous path of the cam follower 30 is plotted in the curve 38 of FIGURE 6 as a function of the rotation of the cam 32. If the cam 32 is rotated as a constant speed, the continuous path 38 can be also considered as plotted as a function of time. The continuous path 38 can be defined as divided into a plurality of equal sectors (corresponding to the number of sectors in a revolution of the cam 32) having four control data points 40–46, wherein the parameters governing the cam follower 30 movement are changed.

Figure 1:
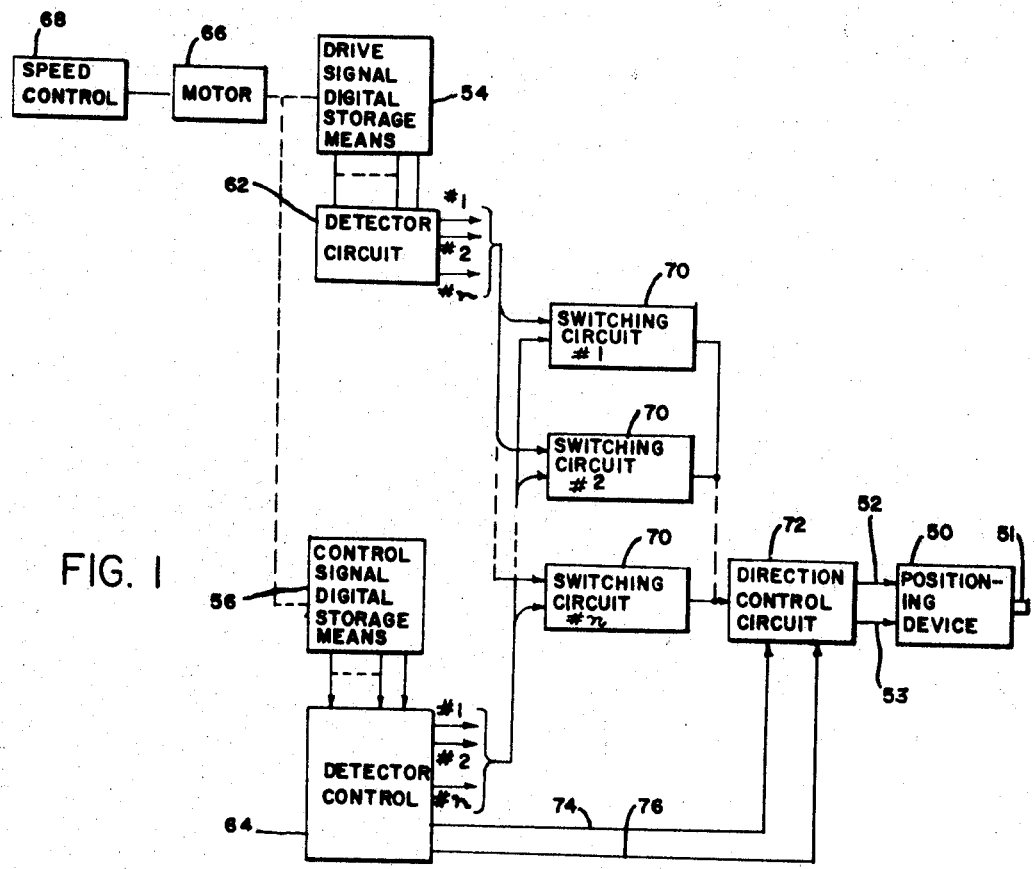
FIGURE 1 is a block diagram of a control system embodying the invention.

In the control system of FIGURE 1 an electro-mechanical signal generating means is provided to develop electrical drive signals and switching signals in a predetermined sequence to drive a positioning device or motor means 50. The positioning device or motor means 50 includes an output shaft 51 coupled to drive a controlled element (not shown) along a continuous path. The positioning device or motor means 50 is responsive to a cycle or pulse of input signal for developing a predetermined motor shaft 51 movement per cycle or pulse received. In the particular embodiment two separate input circuits 52 (forward) and 54 (reverse) are included for providing a means of controlling the direction of movement of motor shaft 51. It will be understood, of course, that other methods of controlling the direction of movement such as reversing signal polarity, switching motor fields, etc. can also be employed.

Figure 3:
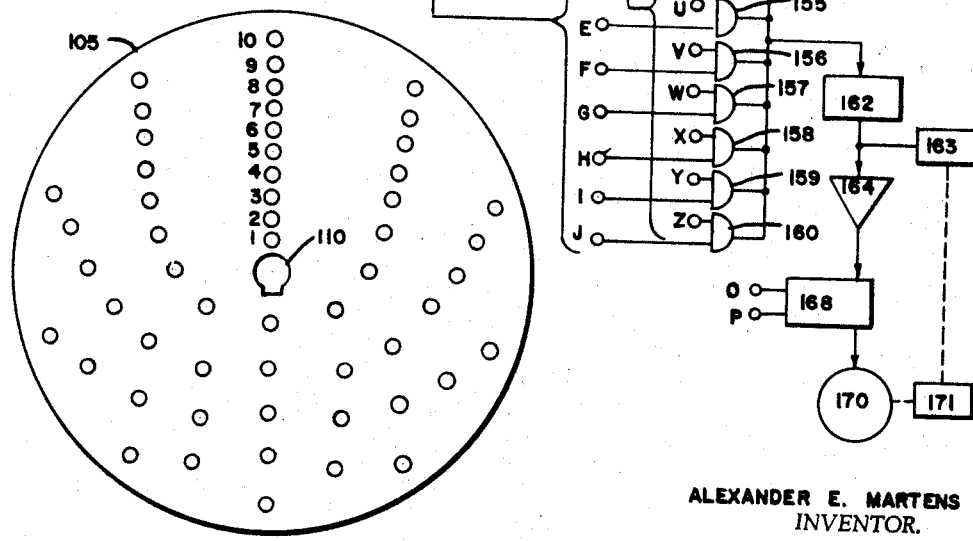
FIGURE 3 is an illustration of a drive signal generating disk of FIGURE 2 used for generating a plurality of synchronous drive signals.

The control system includes a drive signal digital information storage means 54 and a control signal digital information storage means 56 that cooperate with the detector circuits 62 and 64 respectively to generate the electrical signals for the system. The digital information storage means 54 and 56 can, for example, be disks having digital bits of information encoded in concentric circles or channels about the center of the disks (FIGURES 3, 4 and 8) or card encoded in rows and columns (FIGURE 9). The discrete digital bits of information may be, for example, perforations for photoelectric detection, conductors for brush type electrical connection to the detector circuits, or magnetic material to induce currents in magnetic sensors.

The digital information storage means 54 and 56 are rotated by a motor 66. A speed control circuit 68 is provided to control the speed of the motor 66. The digital information storage means 54 and detector circuit 62 cooperate to provide a plurality of periodic drive signals (1–n) of different frequencies or pulse rates, each frequency providing a separate drive signal for driving the positioning device or motor means 50 at different output rates or velocities.

A plurality of switching circuits 70 (numbered 1-n) are included in the control system, one for each drive signal frequency. The output circuits 1–n of the detector circuit 62 are coupled to correspondingly numbered switching circuits 70 to provide drive signals to be passed by the switching circuits.

A plurality of control or switching signals are generated in the detector circuit 64 by the rotation of the control signal digital information storage means 56. The output circuits designated 1–n of the detector circuit 64 are coupled to correspondingly numbered switching circuits 70 to apply control or switching signals thereto to turn the connected switching circuits on for a predetermined period and in a preset sequence determined by the encoded information in control signal digital information storage means 56. The applied drive signal is passed by the switching circuit while the control or switching signal is applied thereto.

The output circuits of the switching circuits 70 are coupled in common to a direction control circuit 72. The direction control switching circuit 72 functions to apply the drive signals passed by the switching circuits 70 to one of the forward or reverse input circuits 52 and 53 of the positioning device or motor means 50. The direction control circuit is controlled by a switching signal developed in one of a pair of direction control output circuits 74 and 76 of the detector circuit 64 in response to the rotation of the control signal digital information storage means 56.

Accordingly, the control signal digital information storage means 56 and the detector circuit 64 cooperate to generate signals to control the direction of movement and the timing or sequence for turning the switching circuits 70 on and off thereby controlling the rate, distance and direction of movement of the motor means 50 by selecting the drive signal frequency or pulse rate to be applied and the duration thereof.

Figure 2:
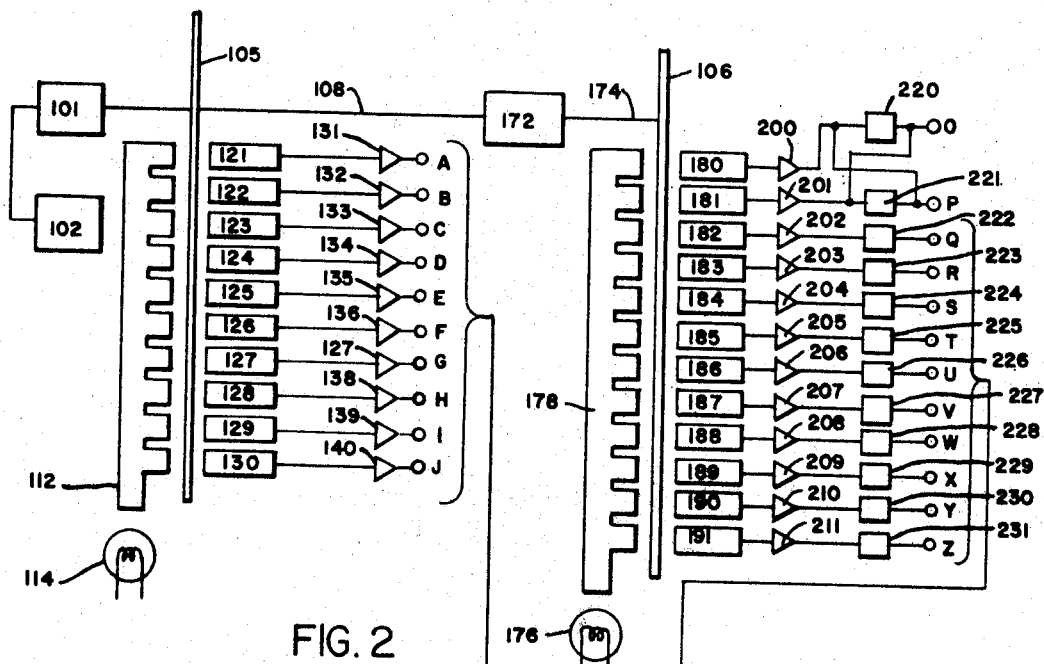
FIGURE 2 is an expanded block diagram of the control system of FIGURE 1.

In FIGURE 2, a control system is illustrated wherein a single forming element motion is controlled. A motor 101 is operated through a motor speed control circuit 102, to control the rate at which the controlled element travels along the continuous path thereby controlling the production rate of the system. The manner by which the speed control determines the production rate is fully explained in a later portion of the specification. The speed control 102 controls the speed of the motor 101 which drives the drive signal information digital storage means, such as the digital disk 105 of FIGURE 3 and a control signal digital information storage means such as the digital cam 106 of FIGURE 4.

The digital disk 105 is encoded with perforations and rotates about the shaft 108 in response to the rotation of the motor 101. The embodiment of the digital disk 105, illustrated in FIGURE 3, has ten channels which are defined by concentric circles around a center mounting hole 110, each channel containing a number of perforations through which radiation is directed. Each successive channel from the center has an increasing number of perforations. The number of channels and perforations are determined by the number of pulse frequencies needed.

The digital disk 105 is illuminated by a fiber bundle 112. A source of illumination 114 directs radiation through the fiber bundle which in turn directs the radiation through perforations in the disk 105. As a light is passed through a perforation in the disk, a corresponding photosensor 121–130 on the opposite side is illuminated. The photosensors 121–130 are connected to an amplifier 131–140 which in turn amplify and shape the drive signal generated by a corresponding photosensor. Accordingly, as the digital disk 105 is rotated, the photosensors 121–130 generate a plurality of drive signals, in synchronization with each other, but being of different frequencies. The amplifiers 131–140 amplify the corresponding signals that are initiated by the mating photosensors and develop the plurality of drive signals at the connected output terminals A–J.

Each of the amplifier output terminals A–J is connected to a similarly designated input circuit of a separate switching circuit, illustrated as the gates 151–160. A drive signal is continuously applied to each of the gates. The drive signals do not pass through the gates unless a switching or control signal is applied. The output circuits of the gates 151–160 are connected to a pulse shaper 162. The pulse shaper 162 is connected to apply the drive signals to an amplifier 164 which in turn is connected to apply amplified drive signals to the direction control circuit 168. The direction control circuit 168 determines the direction of motion of the motor 170 which in turn drives a controlled or forming element 171.

An example of a suitable motor is a commercially available Fujitsu 1/5SS electrohydraulic pulse motor. The Fujitsu motor is essentially an electrohydraulic stepping motor for providing an accurately duplicated output motion in response to a cycle or pulse of signal applied thereto. The Fujitsu motor includes two input circuits, one for forward motion and the other for reverse motion, wherein the direction of motion is determined by the terminal of the signals applied.

An over travel sensor 163 is coupled to the input circuit of the amplifier 164. The over travel sensor 163 blocks any drive signals applied to the amplifier 164 when the forming element has reached a preset limit of travel.

The shaft 108 driving the digital disk 105 also drives the digital cam 106 through a speed reducing gear box 172 and a shaft 174. Although the speed of the output shaft 174 from the gear box 172 is less than the input drive shaft 108, a synchronous relation between the digital disk 105 and the digital cam 106 is still maintained. A source of illumination 176 illuminates the end of the fiber bundle 178 directing radiation through perforations in the digital cam 106, which is positioned between the fiber bundle 178 and the photosensors 180–191.

Figure 4:
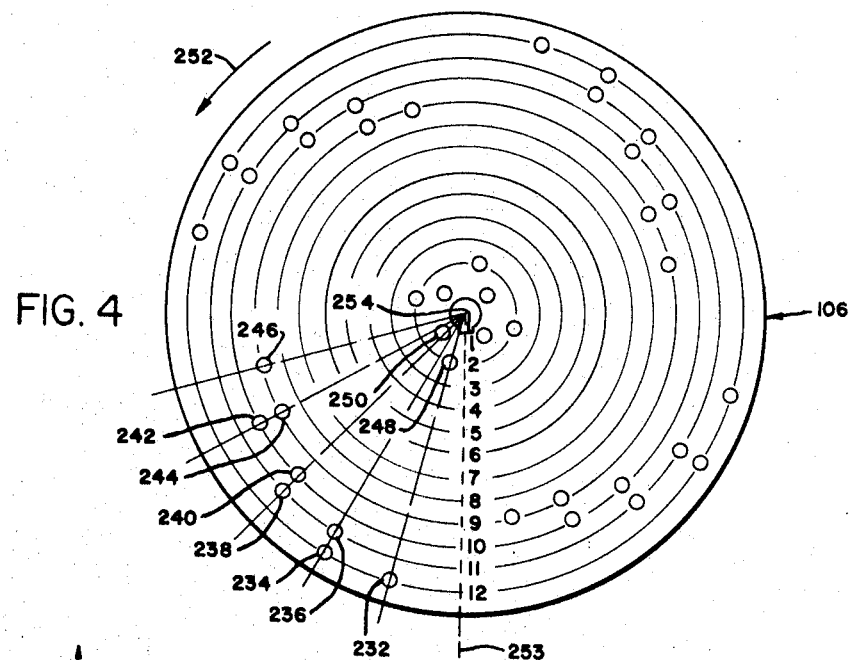
FIGURE 4 illustrates a control signal digital cam of FIGURE 2 having digital information stored therein in the form of perforations.

The embodiment of the control signal digital cam 106 illustrated in FIGURE 4 has digital information bits stored therein in the form of perforations in a preset pattern. As the digital cam 106 is rotated, the perforations follow circular paths about the center of the disk and pass the photosensors 180–191 (positioned in the circular paths along the dashed line 253) to direct radiation corresponding to the stored digital information bits on the photosensors thereby generating a plurality of control or switching signals in a predetermined sequence. The control signals generated by the photosensors 181–191 are coupled to the amplifiers 200–211 respectively. The output circuits of the amplifiers 200–211 are coupled to the bistable flip-flop circuits 220–231 respectively, having output circuits designated O–Z. A first control signal applied to a flip-flop circuit sets the circuit into one stable state and the second control signal resets the circuit into the original stable state. The output circuits O and P are coupled to the input circuits of the flip-flops 221 and 220 respectively so that when the flip-flop 220 is set, the flip-flop 221 is reset and vice versa. The output circuits Q–Z are coupled to correspondingly lettered input circuits of the gates 151–160. When one of the flip-flops 222–231 are set, a control or switching signal is applied to the connected gate circuit to allow the applied drive signal to pass therethrough. The output circuits O and P are also coupled to correspondingly lettered input circuits of the direction control circuit 168 to provide control signals for governing the direction of movements of the motor 170.

Referring to FIGURE 4, the digital cam 106 contains information for controlling the motion of the forming element to produce four identical parts. The digital cam 106 will be considered to rotate in a counterclockwise direction as designated by the arrow 252. As previously mentioned, photosensors are positioned along the dashed vertical line 253 above the slot 254 for receiving a key in the shaft 174.

As the digital cam 106 rotates, the perforations 248 and 232 permit the light to actuate the photosensors 181 and 191 respectively. The signal developed by the photosensor 181 is amplified by the amplifier 201 and applied to set the flip-flop 221, which in turn resets the flip-flop 220 and also actuates direction control circuit 168 to cause the motor 170 to rotate in the desired direction. The signal developed by the photosensor 191 is amplified by the amplifier 211 and applied to set the flip-flop circuit 231. The output circuit Z of the flip-flop 231 is connected to the input circuit Z of the gate 160 for applying a control signal to allow the applied drive signals (from the amplifier 140 output terminal J) to pass through the gate 160 to the pulse shaper 162. The drive signals are coupled through the pulse shaper 162, the power amplifier 164 and the direction control circuit 168 to the motor 170 to drive the motor at a rate determined by the frequency of the drive signals.

As digital cam 106 rotates further, the perforations 234 and 236 actuate the photosensors 191 and 190 respectively. The signal developed by photosensor 191 is amplified by the amplifier 211 and applied to reset the flip-flop 231 to its original condition removing the control signal from the gate 160 and preventing the further passage of the applied drive signal. At the same time, the signal developed by the photosensor 190 is amplified by the amplifier 210 and applied to set the flip-flop 230. The output circuit Y of the flip-flop 230 is connected to the input circuit Y of the gate 159 for applying a control signal to allow the applied drive signals (from the amplifier 139 output terminal I) to pass through the gate 159. Since the frequency of drive signal generated at the output terminal I is different than that of the terminal J, the motor 170 is driven at a different rate causing a different rate of movement of the forming element 171.

As digital cam 106 continues to rotate the perforations 238, 240 and 250 simultaneously actuate the photosensors 190, 189 and 180 respectively. The control signal developed by the photosensor 190 resets the flip-flop 230 terminating the control signal to the gate 159. The photosensor 189 generates a signal which is amplified and applied to set the flip-flop 229. The flip-flop 229 applies a control signal to the gate 158. This permits the signals from the amplifier 138 output terminal H to pass through the gate 158 and in turn drive the motor 170 at a third rate determined by the drive signal frequency. The photosensor 180 sets the flip-flop 220 which in turn resets the flip-flop 221 and activates the direction control circuit 168 to reverse the direction of the motor 170 and the movement of the controlled forming element 171.

As the digital cam 106 continues to rotate the perforations 242 and 244 actuate the photosensors 189 and 188 respectively. The output signal of the photosensor 189 resets the flip-flop 229 to the original condition cutting off the gate 158 while the output signal of the photosensor 188 sets the flip-flop 228 to turn the gate 157 on. The gate 157 passes the frequency developed at the amplifier 137 output terminal G to drive the motor 170 at a fourth rate until the perforation 246 actuates the photosensor 188, wherein the flip-flop 228 is reset to its original condition and the gate 157 is turned off. This completes one cycle of the forming process. Four such processes are included in a single rotation of the digital cam 106.

As a result, several trains of pulses are applied to the motor 170 to drive the motor in a predetermined manner. The preset digital pattern encoded in the digital cam 106 determines the frequency of the drive signals the duration thereof and the sequence by which the drive signals are applied to the motor 170. The frequency is determined by the channel or circles in which the perforations are located and the duration of a train of drive signals is determined by the spacing between the perforations in the channels or circles and the speed at which the digital cam 106 is rotated.

It should be noted that the control signal digital cam 106 is mechanically synchronized to rotate with the drive signal digital disk 105 so that the ratio of the speed of rotation of the disk and the cam remains fixed. As a result, as the speed of rotation of the motor 101 is changed the controlled element 171 still follows the same continuous path but at a changed rate. For example, if the speed of rotation of the disk 105 and the cam 106 is increased, the drive signal frequency generated by the photosensor 121–130 increases but the time duration the gates 151–160 are turned on is decreased so that the same number of pulses are passed by the gate per applied switching signal. As a result, the production rate of a manufacturing process employing the control system of FIGURES 1 and 2 can be increased or decreased by simply changing the speed of the motor 101.

Figure 8:
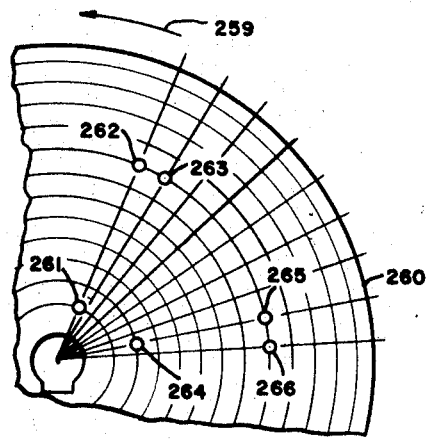
FIGURE 8 is an illustration of a control signal digital cam for providing digital signals for simulating the motion of the cam follower of FIGURE 6.

The digital cam 260 of FIGURE 8 is adapted to be substituted for the digital cam 106 in the control system of FIGURE 2 for developing control signals to duplicate the continuous path 38 of the cam follower 30 (FIGURE 6). Only a portion of the cam 260 is shown but it can be assumed the remainder of the cam includes identical data for a cyclic or repetitive type of operation. When the digtal cam 260 is rotated counterclockwise as designated by the arrow 259, the perforations 261 and 262 actuate the photosensors 180 and 187. The signal generated by the photosensor 180 sets the flip-flop 220 resetting the flip-flop 221 and also actuating the direction control circuit 168 for the desired direction of controlled element motion. Photosensor 187 generates the pulse 270 (FIGURE 6) which in turn sets the flip-flop 227 to develop the switching or control signal 271 (FIGURE 6). The control signal 271 turns the gate 156 on to pass a train of signal pulses 272 (FIGURE 6) to the motor 170 corresponding to the frequency of the drive signal on the amplifier 136 output terminal F. As the digital cam 260 continues to rotate, the perforation 263 actuates the photo cell 187 to generate the pulse 273 (FIGURE 6) which resets the flip-flop 227 cutting off the control signal 271 (FIGURE 6) and the gate 156. The motor 170 responds to the drive signal pulses 272 to provide the desired motion between the control points 40 and 42 (FIGURE 6).

No further drive signals are passed to the motor 170 until the digital cam 260 has rotated so that the perforations 264 and 265 (FIGURE 8) simultaneously acuate the photosensors 181 and 187 respectively. The signal generated by the photosensor 181 sets the flip-flop 221 and resets the flip-flop 220 reversing the direction of motion of the motor 170. The photosensor 187 generates the pulse 274 (FIGURE 6) setting the flip-flop 227 to produce the control signal 275 which turns the gate 156 on to pass the train of pulses 276 corresponding to the frequency of the drive signal at the amplifier 136 terminal F. As the digital cam 260 rotates further, the perforation 266 (FIGURE 8) actuates the photosensor 187 to generate the pulse 277 (FIGURE 6) which in turn resets the flip-flop 227 and cuts the gate 156 off. The motor 170 responds to the drive signal pulses 276 to provide the desired controlled element 171 motion between the control points 44 and 46 (FIGURE 6). It should be noted that the controlled element 171 is now in start position to begin another cycle of operation for a repetitive type of operation.

Figure 7:
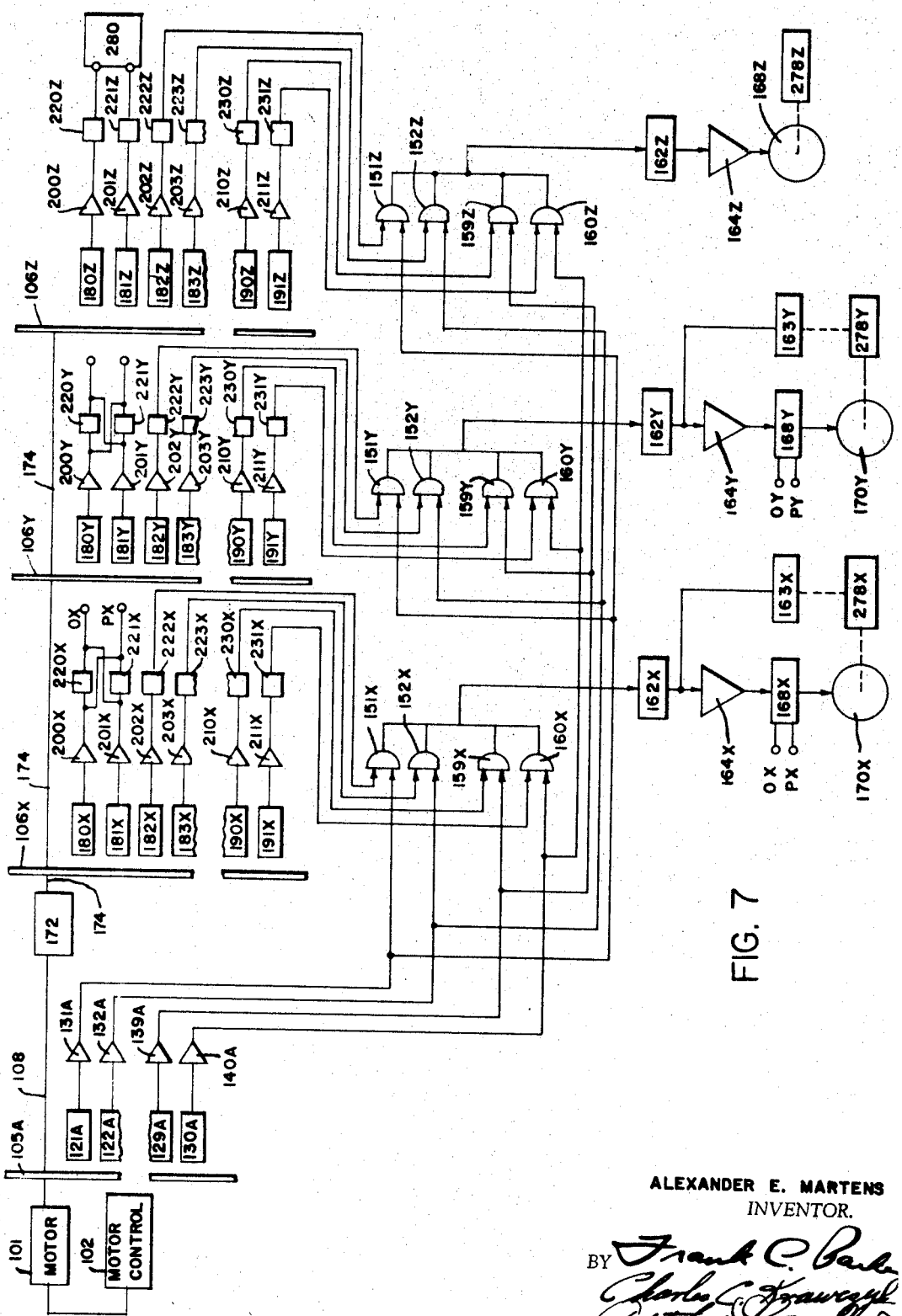
FIGURE 7 is a block diagram including the control system of FIGURE 1 for simultaneously and synchronously controlling the motion of three separate controlled elements or a single controlled element in any direction.

FIGURE 7 illustrates a motion control apparatus providing motion for three separate controlled elements, element in three directions which may be considered in the X–Y and Z directions. The X–Y–Z axes are used for the purpose of illustration only, the directions might also be additive or subtractive to provide the desired movement of the forming element. Like components in FIGURES 2 and 7 are designated by the same reference numerals except that the components in three control circuits are additionally designated by a letter X, Y or Z following the reference numerals and the components in the drive signal generator circuit are additionally designated by the letter A. The illustration in FIGURE 7 does not show the total number of channels in the drive signal generator and the control circuits as originally shown in FIGURE 2, however, any number of channels may be provided, and the abbreviated illustration is merely to show the operation of the device in combining plural motions.

The control system of FIGURE 7 includes a drive signal generating digital disk 105A and three control signal digital cams 106X, Y and Z having magnetic bits encoded therein. The detection devices for the disk 105A and the cams 106X, Y and Z are magnetic sensitive wherein the magnetic bits generate electrical signals in the detection devices 121A–130A, 180–191X, Y and Z respectively. The signals generated by the detection devices 121A–130A are amplified by the amplifiers 131A through 140A in a manner similar to that shown in FIGURE 2 which in turn are applied to the corresponding gates 151X–160X, 151Y–160Y and 151Z–160Z of the three directions of control.

The signals generated by the detection devices 180–191X are amplified by the amplifiers 200X–211X and are applied to the flip-flops 220X–231X respectively. The output from the flip-flops 222X–231X are applied to the gates 151X–160X and provide a control signal for turning the gate on. The output circuits of the flip-flops 220X and 221X (designated OX and PX) are connected to the direction control 168X input circuits (also designated OX and PX) to provide direction control signals. The output circuits of the gates 151X–160X are coupled to the pulse shaper 162X for applying drive signals thereto. The drive signals are coupled to the amplifier 164X, amplified and fed through the direction control 168X to the motor 170X. The motor 170X drives a forming element 278X. For the purpose of illustration it may be considered that the motion of the forming element 278X controls the rate of movement of the forming element to increase or decrease the spring diameter.

The digital cam 106Y controls the motion of the forming element in a second direction. The digital cam 106Y carries magnetic bits as does the digital cam 106Y for generating signals in the detection devices 180Y–191Y. The information stored on the digital cam 106Y controls the motion by generating signals in the detection devices which are amplified in the amplifiers 200Y–211Y. The signals from these amplifiers are applied to the flip-flops 220Y–231Y. The control signals of the flip-flops 222Y–231Y are applied to the gates 151Y–160Y, wherein drive signals are then fed through the pulse shaper 162Y, and the power amplifier 203Y. The amplified drive signals are applied to the directional control 168Y and to the motor 170Y. The flip-flop 220Y and 221Y output circuits OY and PY are connected to the direction control 168Y input circuits OY and PY respectively for controlling the direction of the motor 170Y. The motor 170Y supplies motion in the second direction for the forming element and may be considered the pitch control 278Y in the forming of a metal spring.

The digital cam 106Z is also connected to the shaft 174 and rotates in synchronism with the digital cams 106X and 106Y. The digital cam 106Z has information stored in the form of magnetic bits which controls the motion in a third direction for the motion control or in the case of spring making machines the wire feed mechanism. The magnetic bits generate signals in the detection devices 180Z–191Z. These signals are amplified through the amplifiers 200Z–211Z. The output of these amplifiers is applied to the flip-flops 220Z–231Z. The flip-flops 222Z–231Z are connected to apply control signals to the gates 151Z–160Z. The flip-flops 220Z and 221Z apply a signal a wire cutter 280 for severing the wire at the desired time. The drive signals passing through the gates 151Z–160Z are fed through a pulse shaper 162Z to a power amplifier 164Z for driving the wire feed motor 170Z. In the case where the forming element is connected as a material drive, such as the wire drive in spring making machine, the travel path is in a single direction and there is no need for a direction control or an over travel sensor.

From the description of the operation it can be seen that any number of motions can be controlled by the infomation in a plurality of digital cams. The digital cams can be formed to contain a large variety of digital information to provide a large variety of desired continuous paths. As illustrated in FIGURE 7 the cams 106X, Y and Z are coupled for synchronous rotation by the shaft 174. The shaft 174 is coupled through the gear box 172 and the shaft 108 to the disk 105A and the motor 101. It should be noted, that as the speed of rotation of the motor 101 is changed, the speed of rotation of the disk 105A and the cams 106X, Y and Z change proportionally so that the forming elements 278X, Y and Z follow the same path or contour but at a changed rate. As a result, the production rate of a machine employing the control system of FIGURE 7 can be increased or decreased by merely changing the speed of rotation of the motor 101 correspondingly.

Although the embodiment in FIGURE 7 providing controlled motion for three separate controlled elements is illustrated having four separate digital cams 105A, 106X, 106Y and 106Z, it is to be understood that, depending upon the amount of data to be stored and the size of the digital cam, a single digital cam can be used to provide the digital information to control several controlled elements. In such a case, the photosensors corresponding to the drive signal generator and several controlled elements are aligned with corresponding concentric circles or channels of digital information on a common digital cam and generate the control signals as previously covered with respect to FIGURES 2 and 7.

An IBM type of card 300 of FIGURE 9 is a second embodiment of a digital cam. The digital bits information are stored in the card type digital cam 300 in the form of perforations. Perforations corresponding to the same command or control signal in the digital cams of FIGURES 4 and 9 are designated by the same reference number. The card type digital cam 300 also contains information for controlling the motion of the forming element to produce four identical as does the cam 106.

The card type digital cam 300 is adapted to be wrapped about a cylinder 302 (FIGURES 10 and 11) so that the card type digital cam covers an opening 304 and the ends of the card are secured by a pair of spring clips 306 and 308. The cylinder 302 includes an end 310 that is adapted to be mounted in a bearing 312 (FIGURE 10) and also includes a shaft 314 mounted to the end 310 for providing a rotational force thereto. The shaft 314 is adapted to be coupled for synchronized rotational relation with the drive signal digital information storage means 54 (FIGURE 1).

The cylindrical drum 302 is mounted in the bearing 312 and the card type digital cam 300 fastened to the drum so that each row on the card type digital cam 300 (numbered 1–12) is aligned with a corresponding one of a plurality of photosensors 180–191 so that the perforations having the same reference numerals in the digital cams 106 and 300 actuate the same photosensors. A fiber bundle 316 is shown inserted into the cylindrical drum 302 and positioned opposite the photosensors 180–191 providing the required source of radiation. As the cylindrical drum 302 is rotated in the direction designated by the arrow 318 the various photosensors are actuated when a perforation passes between the fiber bundle and the photosensor, providing the control signal in a similar manner as previously described with reference to the disk type digital cam 106. A card type digital cam and a cylindrical drum drive can be substituted for the disk type digital cams 105A, 106X, 106Y and 106Z of FIGURE 7 and coupled for synchronized rotation through the shafts 174 and 108 and the gear box 172 to provide the control signals as previously covered with regards to FIGURE 7.

The illustration shown is directed to a forming element such as necessary in the process of spring making and is for the purpose of illustration only. It is understood that a metal forming element may be used for various operations in the field of manufacture and the inventor does not wish to limit his invention to that of the field of spring making.

The preferred embodiment of this invention has been set forth in the drawings and the prior description and it is understood that other embodiments might be devised

I claim:

1. A control system comprising:
   signal generating means for generating a plurality of periodic signals of different frequencies;
   motor means for providing a predetermined movement in response to a cycle of a signal applied thereto;
   a plurality of switching circuits, each being responsive to a switching signal for actuation thereof, coupled between said signal generating means and said motor means for selectively translating said plurality of periodic signals to said motor means;
   control signal information storage means defining information stored in a preset pattern;
   means for movably mounting said control signal information storage means for repetitive movement;
   control circuit means mounted adjacent said control signal information storage means for detecting the information stored therein and developing sequential switching signals in response to the movement of said control signal information storage means having a sequence and time duration determined by said preset pattern and the rate of movement thereof, thereby defining a programmed switching sequence, and
   circuit means coupling said control circuit means to said plurality of switching circuits for applying switching signals thereto so that said switching circuits are actuated in a predetermined order in accordance with said programmed switching sequence to translate trains of periodic signals to said motor means, wherein the number of cycles of periodic signals in said trains is a function of the frequency of the periodic signal being translated and the time durations of the switching signals.

2. A control system as defined in claim 1:
   wherein said signal generating means includes a rotatably mounted information storage means, sensing means mounting adjacent to said information storage means for generating signals of different frequencies in response to the rotation of said digital information storage means and a motor coupled to rotate said information storage means, and
   means for coupling said means for movably mounting said control signal information storage means to said motor included in said signal generating means for synchronizing the movement of said control signal information storage means with said rotation of said information storage means included in said signal generating means.

3. A control system as defined in claim 2 including:
   means for varying the speed of said motor included in said signal generating means.

4. A control system defined in claim 1:
   wherein said motor means includes an amplifier circuit coupled to apply amplified signals to a stepping motor, said stepping motor providing a predetermined movement in response to a signal applied thereto and wherein the rate of motion is determined by the frequency of the signal applied thereto, and
   circuit means coupled between said control circuit means and said motor means for controlling the direction of motion of said motor means.

5. A control system defined in claim 1:
   wherein said switching means includes a plurality of gate circuits, the number of which corresponds to the number of said plurality of signals generated by said signal generating means so that at least one signal is coupled to a separate one of said gate circuits, said gate circuit being responsive to a switching signal applied thereto for passing the applied signal, and
   wherein said circuit means coupling said control circuit means to said switching means includes means for applying switching signals to said plurality of gate circuits.

6. A control system as defined in claim 1:
   wherein said control signal information storage means comprises a substantially circular disk having digital information stored therein in the form of perforations;
   wherein said means for movably mounting said control signal information storage means includes means for mounting a shaft through the center of said disk and means for bearing mounting said shaft for rotating said disk about its center so that said perforations follow a circular path about the center of said disk, and
   wherein said control circuit means includes a plurality of sensing devices, at least one sensing device for each of said circular paths, positioned along said circular paths for generating a control signal in response to a perforation passing a sensing device and a plurality of control circiuts, one for each of said sensing devices, for generating said switching signals in response to said control signals.

7. A control system as defined in claim 1:
   wherein said control signal information storage means comprises a card having digital information stored therein in the form of perforations;
   wherein said means for movably mounting said control signal information storage means includes a cylindrical drum for mounting said card on the circumference and means for rotating said drum about an axis so that said perforations describe a plurality of circular paths about said axis, and
   wherein said control circuit means includes a plurality of sensing devices for detecting perforations in said card, at least one sensing device for each of said plurality of circular paths and positioned along said circular paths for generating a control signal in response to a perforation passing a sensing device and a plurality of control circuits, at least one for each of said sensing devices, for generating said switching signals in response to said control signals.

8. A motion control device comprising:
   a generator producing a plurality of synchronous electrical signals having different frequencies;
   a digital cam having digital signals arranged in a preset pattern defining programmed information;
   means for movably mounting said digital cam;
   detecting means mounted adjacent said digital cam for detecting said digital signals responsive to movement of said digital cam and generating control signals;
   control circuit means coupled to said detecting means responsive to said control signals for generating switching signals having a sequence and time durations determined by said programmed information and the rate of movement of said digital cam;
   switching circuit means coupled to said signal generator and said control circuit responsive to said switching signals for passing selected ones of said signals in a preset sequence and for preset time duration in accordance with the switching signals, and
   motor means receiving said signals for providing motion according to the programmed information on said digital cam.

9. A motion control device as defined in claim 8:
   wherein said detecting means includes radiation means and a plurality of radiation sensors receiving a radiation form said radiation means;
   wherein said digital cam defines a predetermined pattern of radiation control signals therein in the form of perforations, and
   wherein said means for movably mounting said digital cam mounts said digital cam intermediate said source of radiation and said photosensors whereby said radiation fall on said photosensors to develop control signals when perforations pass between said source of radiation and said photosensors.

10. A motion control device as defined in claim 8:
wherein said digital cam includes magnetic digital bits, and
wherein said detecting means includes a plurality of magnetic sensors that sense the magnetic bits in said digital cam and generate control signals in response thereto.

11. A control system comprising:
first and second disks defining program information in the form of a plurality of perforations in concentric circles about an axis of rotation;
first and second detecting means each including a source of radiation and a plurality of photosensors receiving radiation from said source of radiation;
means for mounting said first disk for rotation about said axis so that said disk is intermediate said source of radiation and said photosensors of said first detecting means whereby said photosensors develop a plurality of synchronous electrical periodic signals of different frequencies as said first disk is rotated;
means for mounting said second disk for rotation about said axis of rotation so that said disk is intermediate said source of radiation and said photosensors of said second detecting means whereby said photosensors develop electrical control signals defining a programed switching sequence in response to the rotation of said second disk;
variable speed cointrol means coupled to said first and second disk mounting means for rotating said first and second disks in synchronous relation;
motor means for providing a predetermined motor shaft movement in response to a cycle of an electrical signal applied thereto and wherein the rate of movement is determined by the frequency of the electrical signal applied thereto;
a plurality of gate circuits, corresponding to at least the number of electrical periodic signals developed by said first detecting means, adapted to pass said periodic signals in response to a control signal applied thereto;
circuit means coupling said first detecting means photosensors to said plurality of gate circuits for applying at least one of the plurality of periodic signals to said gating circuits;
circuit means coupling selected ones of said plurality of photosensors in said second detecting means to said gate circuits to apply control signals to said gate circuits according to said programmed switching sequence whereby a first control signal developed by a photosensor renders the correspondingly coupled one of said gate circuits operative to pass the applied periodic signal while the following control signal developed by said photosensor renders said gate circuit inoperative to pass the applied periodic signal;
amplifying means coupled between said plurality of gate circuits and said motor means for applying trains of amplified periodic signals to said motor means, the duration of a train being determined by the time a gate circuit is rendered operative to pass a periodic signal and the frequency of the periodic signal in said train being dependent upon the frequency of the signal coupled to said gate circuit being rendered operative to pass periodic signals whereby the motor shaft repetitively moves along the same path independent of the speed of rotation of said first and second disks.

12. A control system as defined in claim 11 including:
direction control means for controlling the direction of movement of said motor shaft in response to a control signal applied thereto;
circuit means coupling said direction control means to the photosensors in said second detection means other than said photosensors coupled to said plurality of gate circuits to apply control signals to direction control means to control the direction of movement of said motor shaft according to said programmed sequence.

13. A control system comprising:
first and second cylindrical drums having a cylindrical surface shaped with an opening therein;
first and second cards defining programmed information in the form of a plurality of perforations;
means for mounting said first and second cards over said cylindrical surface opening of said first and second drums respectively;
means for mounting said first and second drums for rotation about an axis so that said perforations in said cards follow a circular path about said axis;
first and second detecting means each including a source of radiation and a plurality of photosensors;
means for mounting said first detecting means so that said first card passes between its source of radiation and plurality of photosensors as said first drum is rotated whereby said photosensors develop a plurality of synchronous electric pulse type signals of different frequencies in response to the perforation in said first card;
means for mounting said second detecting means so that said second card passes between its source of radiation and plurality of photosensors as said second drum is rotated whereby said photosensors develop switching signals in response to the perforations in said second card defining a programmed switching signal sequence;
motor means for providing a predetermined motor shaft movement in response to a pulse of an electrical signal applied thereto, and wherein the rate of movement is determined by the frequency of the electrical pulses applied thereto;
a plurality of gating circuits corresponding to at least the number of pulse type signals developed by said first detecting means adapted to pass said signal pulses in response to a switching signal applied thereto;
circuit means coupling said first detecting means photosensor to said plurality of gating circuits for applying at least a separate one of said plurality of pulse type signals to each of said gating circuits;
circuit means coupling selected ones of said plurality of photosensors in said second detecting means to said gating circuits to apply control signals to said gating circuits according to said programmed switching sequence whereby a first control signal developed by a photosensor renders the correspondingly coupled one of said plurality of gating circuits operative to pass the applied pulse type signal while the following control signal developed by said photosensor renders said gating circuit inoperative to pass the applied pulse type signal;
amplifying means coupled between said plurality of gating circuits and said motor means for applying trains of amplified pulse type signals thereto, the duration of a train being determined by the time a gating circuit is rendered operative to pass signal pulses and the frequency of the signal pulses in said train being dependent upon the frequency of the pulse type signal coupled to said gating circuit being rendered operative to pass signal pulses whereby said motor shaft repetitively moves along the same path independent of the speed of rotation of said first and second cards.

14. A control system for controlling the movement of at least one controlled element comprising motor means for controlling the movement of at least one controlled element, a digtial cam means defining information stored in a preset pattern, means for moving said digital cam means, signal generating means mounted adjacent said digital cam means for sensing said stored information and generating a plurality of drive signals of different frequencies and control signals in response to the movement of said digital cam means, switching means connected intermediate said signal generating means and said motor means for translating said drive signals to said motor means in response to control signals applied to said switching means, circuit means connected between said signal generating means and said switching means for applying said control signals thereto whereby said switching means applies consecutive trains of individual drive signals to said motor means in a controlled sequence determined by said preset pattern thereby controlling the movement of said motor means and the movement of at least one controlled element.

15. A control system as defined in claim 1 wherein:
said plurality of switching means includes at least a separate switching circuit for each of said plurality of periodic signals, and
wherein said control circuit means includes at least a separate control circuit for each of said plurality of switching circuits.

16. A control system as defined in claim 1 including:
means for synchronizing the movement of said information storage means with said periodic signals so that the ratio of the rate of movement of said information storage means with respect to the frequencies of said periodic signals remains constant.

17. A control system comprising:
signal generating means for generating a plurality of periodic signals of different frequencies;
a plurality of switching circuits, a separate one for each of said plurality of periodic signals, said plurality of switching circuits being responsive to switching signals for translating said periodic signals;
circuit means for coupling said plurality of switching circuits between said signal generating means and an output terminal for applying different ones of said periodic signals through separate switching signals to said output terminal;
control signal information storage means including digital information stored in the plurality of separate tracks defining a programmed switching sequence;
means for movably mounting said control signal information storage means;
a plurality of sensing means, at least one sensing means for each of said tracks, mounted adjacent said control signal information storage means for developing control signals in response to the movement of said control signals information storage means;
a plurality of control circuits, at least a separate one for each of said plurality of switching circuits, coupled between said sensing means and said switching circuits for generating a plurality of switching signals having preset time durations and a predetermined sequence determined by said programmed switching sequence, and
circuit means coupling said plurality of said control circuits to separate ones of said switching circuits for actuating said switching circuits in a predetermined order to pass trains of periodic signals, the number of said periodic signals in the trains being determined by the frequency of the periodic signal being passed and the duration of the switching signals.

18. A control system comprising:
signal generating means for providing a plurality of signals of different frequencies at separate terminals;
a plurality of switching circuits each having an input circuit connected to separate ones of said terminals for receiving said signals and are responsive to a switching signal for translating said signal to an output circuit;
circuit means for connecting the output circuits of said plurality of switching circuits to a common output circuit;
information storage means defining control signals stored in a preset pattern;
means for moving said storage means;
means, including a plurality of output terminals, mounted adjacent said control signal information storage means detecting the information stored therein and generating a plurality of switching signals on separate output terminals having a sequence and time duration determined by said preset pattern and the rate of movement of said control signal information means, and
circuit means coupling separate ones of said output terminals of said means to separate ones of said switching circuits for actuation thereof to translate the signals to said common output circuit in sequential trains of signals, the number of cycles in each train is determined by the frequency of the signal and the time duration of said switching signal applied to the actuated switching circuit.

19. A control system comprising:
means for generating a plurality of periodic signals of different frequencies;
information storage means including digital information stored in a preset pattern;
means for movably mounting said information storage means;
detection means mounted adjacent said information storage means and responsive to the movement thereof for detecting the digital information stored therein and generating control signals in a preset sequence according to said preset pattern;
an output device;
switching means mounted between said generating means and said output device receiving said periodic signals and being responsive to switching signals for applying said periodic signals to said output device;
control means coupled between said detection means and said switching means, responsive to said control signals, for applying switching signals to said switching means so that said switching means applies sequential trains of periodic signals to said output device and wherein the sequence of the trains and the frequency and the number of cycles of signals in said trains is determined by said preset pattern, and
means for moving said information storage means in synchronous relation with said periodic signals so that the ratio of rate movement with respect to the frequency of said periodic signals remains constant.

References Cited

UNITED STATES PATENTS

| | | |
|---|---|---|
| 3,015,806 | 1/1962 | Wang et al. |
| 3,184,663 | 5/1965 | Mergler _____ 318—39 |
| 3,241,021 | 3/1966 | Schmidt et al. |

ORIS L. RADER, *Primary Examiner.*

THOMAS E. LYNCH, *Assistant Examiner.*

U.S. Cl. X.R.

318—28, 39, 162

PO-1050
(5/69)

UNITED STATES PATENT OFFICE
CERTIFICATE OF CORRECTION

Patent No. 3,439,241      Dated April 15, 1969

Inventor(s) Alexander E. Martens

It is certified that error appears in the above-identified patent and that said Letters Patent are hereby corrected as shown below:

Column 8, line 54, after "elements," insert -- or a single controlled --

SIGNED AND
SEALED

NOV 4 1969

(SEAL)
Attest:

Edward M. Fletcher, Jr.
Attesting Officer

WILLIAM E. SCHUYLER, JR.
Commissioner of Patents